No. 778,323. PATENTED DEC. 27, 1904.
J. H. MARTIN.
IRRIGATING APPARATUS.
APPLICATION FILED AUG. 5, 1903.
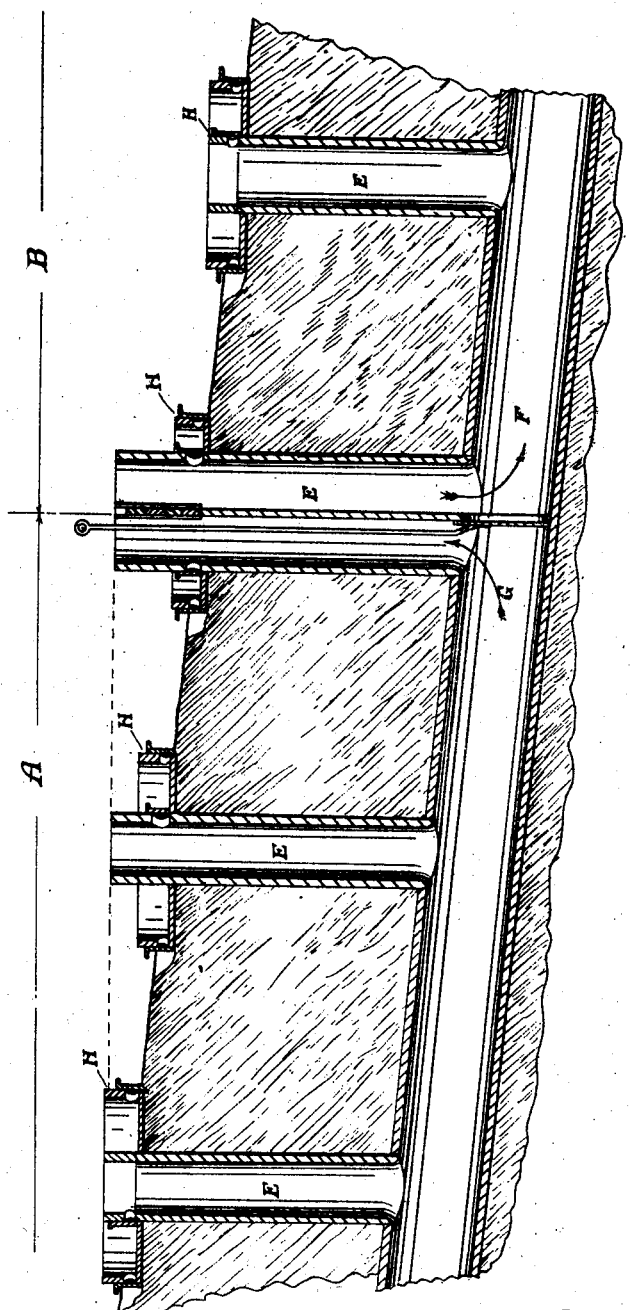
Witnesses
Inventor
Joseph H Martin
By Hazard & Harpham
Attorneys, No. 778,323. Patented December 27, 1904.

UNITED STATES PATENT OFFICE.

JOSEPH H. MARTIN, OF RIVERSIDE, CALIFORNIA, ASSIGNOR OF ONE-HALF TO DAVID ORMAND, OF RIVERSIDE, CALIFORNIA.

IRRIGATING APPARATUS.

SPECIFICATION forming part of Letters Patent No. 778,323, dated December 27, 1904.

Application filed August 5, 1903. Serial No. 168,380.

*To all whom it may concern:*

Be it known that I, JOSEPH H. MARTIN, a citizen of the United States, residing at Riverside, in the county of Riverside and State of California, have invented new and useful Improvements in Irrigating Apparatus, of which the following is a specification.

My invention relates to improvements in irrigating apparatus, and is confined more particularly to that class of irrigation wherein the water is conveyed by means of subterranean pipes to such points where the same is to be used, at which points the water is caused to flow out of upright branches projecting to the surface of the ground and in communication at their lower ends with the pipes, and I have provided such means as will enable its use on ground whose surface is uneven—such, for instance, as on side-hills. I accomplish this by means of the apparatus which is more particularly described and claimed hereinafter.

The accompanying drawing shows a cross-sectional view of my invention.

The system of irrigation herein shown is separated into different divisions, two of which, A and B, are disclosed, the idea being to adapt the conveying-pipe G F for the supply of a large number of branches E E at the same time, and this result is obtained by arranging the discharge-openings of the upright branches in a horizontal line or even with each other rather than making each branch of the same length, so that the discharge-openings will occupy a plane parallel with the conveying-pipe G F. In the latter instance the lowermost branch would discharge all the water and the branches above the lowermost would discharge a diminishing volume of water, if, indeed, any at all were discharged. By arranging the branches so that the discharge-openings thereof are on a horizontal plane with one another or on a level irrespective of the dip of the ground the water will flow up and out of each branch in equal volume.

The conveying-pipe G F is shown as occupying a slanting position, as going downhill, and at suitable intervals the branch pipes E E E are located, the branch pipes being in communication with the pipe G F and projecting above the sloping surface of the ground, the branch pipes of each section having their discharge openings or ends located on a horizontal plane or level with one another, as disclosed by the dotted line. The discharge-openings of each section are arranged on parallel planes with one another, as partially shown in the drawing.

In order to prevent the water flowing out of the discharge-openings from cutting holes in the ground immediately surrounding the upright pipes, I provide valved catch-basins H H, which encircle the protruding ends of the upright branches and are set into or upon the ground-line parallel with the conveying-pipe G F, the water gently welling out of the catch-basins to the ground. A full description of these catch-basins is incorporated in my copending application for patent thereon, filed April 15, 1903, Serial No. 152,789, and hence further description herein would appear unnecessary.

The upright branches at the ends of the different sections do not consist of a single pipe, as do the intermediate branches, but are of double size, as shown, and are each provided with a vertically-extending partition 1, which virtually forms the trunk branches into two pipes 7 and 8, the partition extending into the conveying-pipe G F. That portion of the partition which is in the conduit-pipe G F is provided with an aperture 2 therethrough to permit the passage of water, the remaining portion of the partition constituting a guide and stop for the slide-valve 3, from which a handle 4 extends up through the pipe 7 to a point where it can be grasped and the valve operated. The upper end of the partition does not extend to the top of the trunk-pipe; but guides 5 5 are provided in alinement with the partition, the guides adapted to receive slats 6 6 therebetween, whereby to build the partition to the height of the branch pipe, if desired. The purpose of this construction is to permit more or less of the water which is shot up the branch pipe 7 to flow over the partition and down the branch pipe 8. By means of this arrangement the flow of water from the branch pipes in each section can be controlled and graduated. If a gentle flow only is desired, the slats 6 6 are removed; but if a large head of water is needed the partition is built up by means of the slats, in this way attaining a most advantageous result.

It is evident that slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. An irrigating apparatus comprising a conduit-pipe, a plurality of branch pipes, trunk branch pipes arranged at intervals, a longitudinally-extending partition located in each trunk-pipe and extending into the conduit-pipe, that portion of the partition within the conduit-pipe being apertured, a slide-valve controlling the aperture in the partition, that portion of the partition within the conduit-pipe forming a valve-seat for the valve, and means for operating the valve.

2. An irrigating apparatus comprising a conduit-pipe, a plurality of series of branch pipes, each series constituting a section, trunk branch pipes located at the end of each section, the trunk-pipes being of larger size than the branch pipes, a central longitudinally-extending partition located in the trunk-pipe, means for opening and closing the conduit-pipe at a point substantially in alinement with the partition, the partition being of less height than the trunk-pipe and means for increasing the height of the partition.

3. In an irrigating apparatus, the combination with a conduit-pipe and branch pipes, of a trunk-pipe, a partition extending longitudinally of the trunk-pipe and of less height than the trunk-pipe, means for closing the conduit-pipe at the lower end of the partition, guides located at the upper end of the partition and slats receivable between the guides to adjust the height of the partition.

In witness that I claim the foregoing I have hereunto subscribed my name this 28th day of July, 1903.

JOSEPH H. MARTIN.

Witnesses:
 D. F. BODY,
 H. R. MARTIN.